US009372733B2

(12) United States Patent
Copsey

(10) Patent No.: US 9,372,733 B2
(45) Date of Patent: Jun. 21, 2016

(54) SYSTEM AND METHOD FOR A DISTRIBUTION MANAGER

(75) Inventor: Simon Copsey, Horsham (GB)

(73) Assignee: Open Text S.A., Luxembourg (LU)

(*) Notice: Subject to any disclaimer, the term of this patent is extended or adjusted under 35 U.S.C. 154(b) by 732 days.

(21) Appl. No.: 13/588,307

(22) Filed: Aug. 17, 2012

(65) Prior Publication Data

US 2014/0201344 A1 Jul. 17, 2014

Related U.S. Application Data

(60) Provisional application No. 61/528,858, filed on Aug. 30, 2011, provisional application No. 61/531,463, filed on Sep. 6, 2011.

(51) Int. Cl.
G06F 9/50 (2006.01)
H04L 29/08 (2006.01)

(52) U.S. Cl.
CPC .......... G06F 9/505 (2013.01); H04L 29/08144 (2013.01); H04L 29/08153 (2013.01); H04L 29/08171 (2013.01)

(58) Field of Classification Search
CPC .............. G06F 9/505; H04L 29/08144; H04L 29/08153; H04L 29/08171
See application file for complete search history.

(56) References Cited

U.S. PATENT DOCUMENTS

| | | | |
|---|---|---|---|
| 7,523,155 B2 * | 4/2009 | Hayes, Jr. ..................... 709/200 |
| 7,778,260 B2 * | 8/2010 | Sturniolo et al. ............. 370/401 |
| 8,260,940 B1 * | 9/2012 | Vosshall .................. H04L 67/16 | 709/228 |
| 8,307,414 B2 * | 11/2012 | Zerfos et al. ..................... 726/10 |
| 8,433,804 B2 * | 4/2013 | Swanburg et al. ............ 709/227 |
| 8,493,858 B2 * | 7/2013 | Kamath et al. ................ 370/235 |
| 2002/0159421 A1 * | 10/2002 | Tanimoto et al. ............. 370/338 |
| 2004/0224674 A1 * | 11/2004 | O'Farrell et al. ............. 455/418 |
| 2005/0070265 A1 * | 3/2005 | Korpinen ................ H04M 3/42 | 455/419 |
| 2007/0199076 A1 * | 8/2007 | Rensin et al. ................... 726/27 |
| 2008/0256203 A1 * | 10/2008 | Gorty et al. ................... 709/206 |
| 2010/0022231 A1 * | 1/2010 | Heins et al. ................... 455/418 |
| 2011/0105154 A1 * | 5/2011 | Kim ........................ H04W 4/00 | 455/458 |
| 2012/0023226 A1 * | 1/2012 | Petersen et al. ............... 709/224 |
| 2012/0064819 A1 * | 3/2012 | Heen ........................... 455/3.01 |
| 2013/0031562 A1 * | 1/2013 | Gusak ..................... G06F 9/505 | 718/105 |

* cited by examiner

Primary Examiner — Patrice Winder
Assistant Examiner — Angela Widhalm De Rodrig
(74) Attorney, Agent, or Firm — Sprinkle IP Law Group

(57) ABSTRACT

Embodiments of systems and methods for a distribution manager are presented herein. Specifically, embodiments may receive a request for support for a mobile application and determine a platform server to support the mobile application based on capacity data associated with a set of platform servers in an application table associated with the mobile application. Embodiments may also deliver identification of the platform server over the network, the identification of the platform server comprises connectivity information configured to allow the mobile application to connect to the platform server.

20 Claims, 8 Drawing Sheets

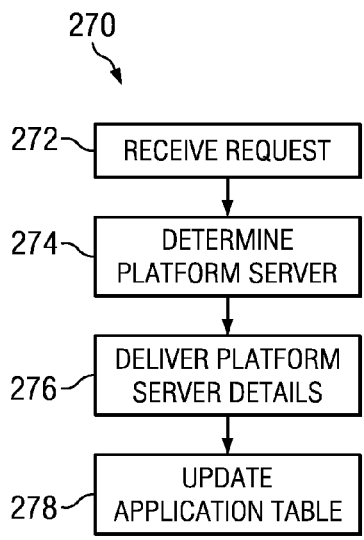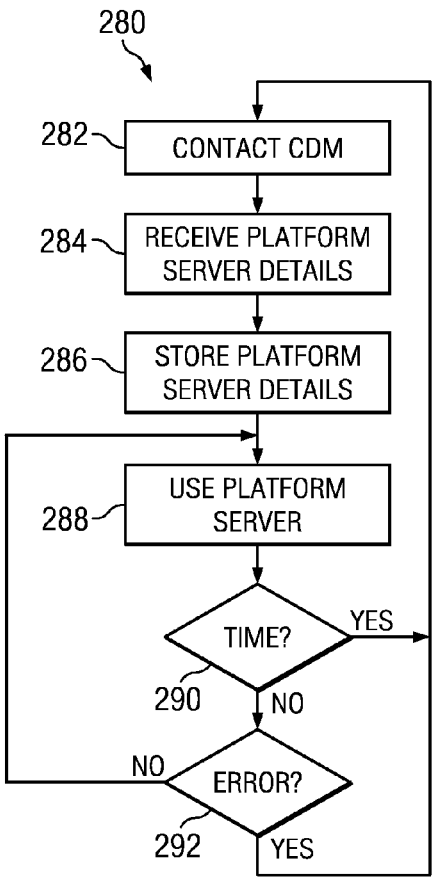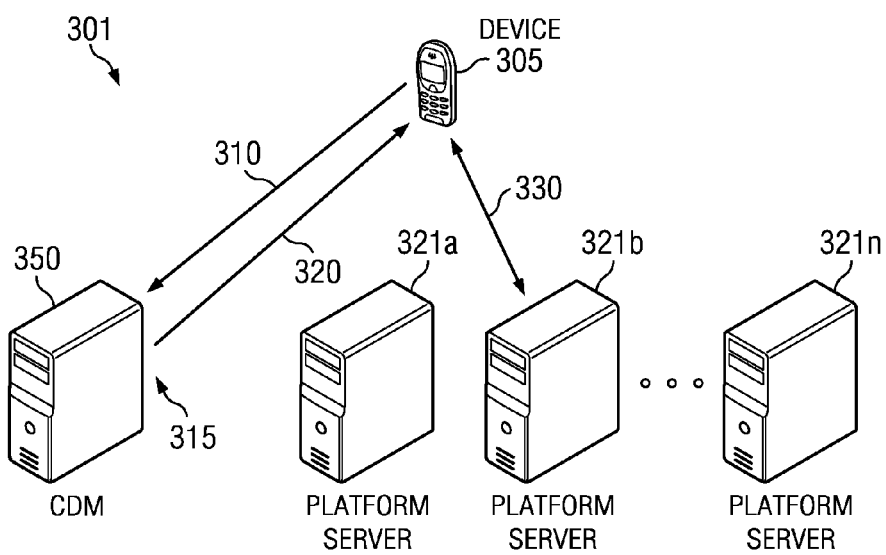

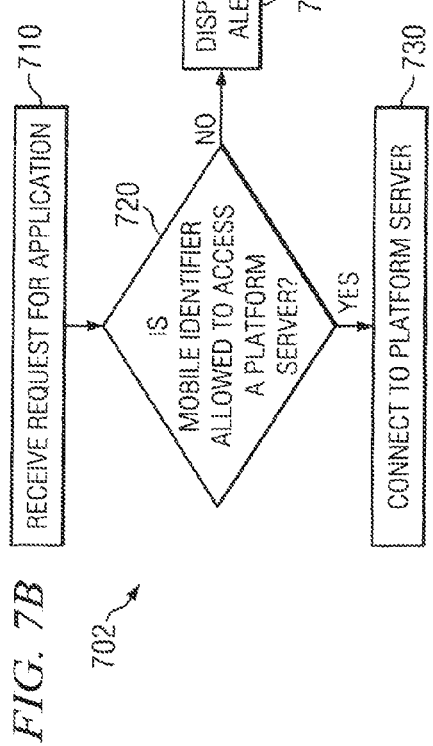

| uid | host | tcp_port | udp_port | app_name | max_users | assigned_users | status | created | createdby | updated | updatedby | metadata |
|---|---|---|---|---|---|---|---|---|---|---|---|---|
| 3 | 157.000.173.000 | 9000 | 9000 | Finance | 100000 | 31 | Available | 1284410116 | XYZ | 0 | | |
| 2 | 157.000.224.000 | 9000 | 9000 | Movies | 100000 | 104541 | Available | 1284410116 | XYZ | 0 | | |
| 1 | 157.000.173.000 | 9000 | 9000 | Elections | 100000 | 123370 | Deprecated | 1284410116 | XYZ | 0 | | |
| 4 | 157.000.173.000 | 9000 | 9000 | Mobile News | 100000 | 47367 | Deprecated | 1284410116 | XYZ | 0 | | |
| 5 | 157.000.224.000 | 9000 | 9000 | TV | 100000 | 85670 | Available | 1284410116 | XYZ | 0 | | |
| 6 | 83.000.206.000 | 8000 | 9000 | Finance | 1000 | 0 | Deprecated | 1284410116 | XYZ | 0 | | |
| 7 | 157.000.224.000 | 9000 | 9000 | Finance_mobile | 100000 | 105445 | Available | 1284410116 | ABC | 0 | | |
| 8 | 157.000.255.000 | 9000 | 9000 | Finance_mobile | 100000 | 0 | Deprecated | 1284410116 | ABC | 0 | | |
| 9 | 157.000.224.000 | 9000 | 9000 | Elections | 100000 | 12725 | Available | 1284410116 | ABC | 0 | | |
| 10 | 62.000.144.000 | 9000 | 9000 | Retirement | 100000 | 19450 | Available | 2147483647 | ABC | 0 | | |
| 11 | 62.000.144.000 | 9000 | 9000 | Pricing | 100000 | 229 | Available | 1337265600 | ABC | 0 | | |

SYSTEM AND METHOD FOR A DISTRIBUTION MANAGER

RELATED APPLICATIONS

This patent application claims the benefit of priority under 35 U.S.C. 119 to U.S. Provisional Patent Application Ser. No. 61/528,858, filed Aug. 30, 2011 entitled "SYSTEM AND METHOD FOR CLOUD DISTRIBUTION MANAGER," and U.S. Provisional Patent Application Ser. No. 61/531,463, filed Sep. 6, 2011, entitled "SYSTEM AND METHOD FOR CLOUD DISTRIBUTION MANAGER," which are incorporated herein in their entirety by reference.

TECHNICAL FIELD

This disclosure relates generally to the deployment of network based applications. Specifically, this disclosure relates to the dynamic assignment and provisioning of platforms to support deployed applications in a mobile environment.

BACKGROUND

In recent years the increasing prevalence of applications for mobile devices has led to greater amounts, and more varied amounts, of data traffic communicated through networks and a greater load on the platforms that support these applications. Further, different applications may have different usage profiles, with certain applications having large surges of usages during particular time periods but relatively little usage at other times. Other applications may have a relative constant usage.

Platforms that support mobile applications may, however, have a finite capacity. This capacity may be exceeded, especially in times of high demand. However, it is an inefficient and perhaps costly use of resources to deploy additional platforms to support peak usage of the application if those platforms will be underutilized once the peak demand subsides.

Accordingly, it is desired to dynamically and efficiently deploy and deprecate platforms for mobile applications and dynamically route those mobile applications to the various deployed platforms to achieve a variety of desired goals.

SUMMARY

Different applications may have different usage profiles, and for certain applications it may be difficult to determine how many users may choose to use a mobile application at any given time. Issues may arise when there are more users desiring to utilize an application than a platform will support, when trying to efficiently determine a number of platforms to support an application, when routing users to platforms or for other reasons.

Embodiments of systems and methods for a distribution manager are presented herein. Specifically, embodiments may receive a request for support for a mobile application and determine a platform server to support the mobile application based on capacity data associated with a set of platform servers in an application table associated with the mobile application. Embodiments may also deliver identification of the platform server over the network, the identification of the platform server comprises connectivity information configured to allow the mobile application to connect to the platform server.

More specifically, in certain embodiments, a distribution manager may select a platform to support an application, divert an application to another platform or deliver a message that there are currently no other available platforms, efficiently manage the loads of platforms supporting an application, instantiate new platforms supporting the application, deprecate platforms supporting the application or perform other actions.

In an embodiment, the request for support is received after a time period has elapsed or if connectivity between the mobile application and the platform cannot be established.

In an embodiment, if the connectivity between the mobile and the platform cannot be established the instructions are configured to determine a new platform to support the mobile application.

In an embodiment, the capacity data is associated a total number of users each platform within the set can support and a number of users assigned to each platform within the set.

An embodiment may create a new platform if a capacity threshold associated with the platform and the capacity data is exceeded.

An embodiment may deprecate a platform within the set of platforms based on the capacity data for the set of platforms.

An embodiment may determine that a version of the mobile application is not the most up to date version of the mobile application, and deliver an update of the mobile application.

In an embodiment, the request includes a device identifier, and the embodiment may compare the device identifier with identifiers within the application table to determine whether to assign the platform to the mobile application.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIG. 2B depicts an embodiment of a method for the deployment of a mobile application.

FIG. 2C depicts an embodiment of a method for the deployment of a mobile application.

FIG. 3A depicts a block diagram illustrating one embodiment of a topology with a distribution manager.

FIG. 7B depicts an embodiment of a method utilized by a distribution manager for a security feature.

FIG. 8 depicts one embodiment of an application table.

DETAILED DESCRIPTION

Figure 1:
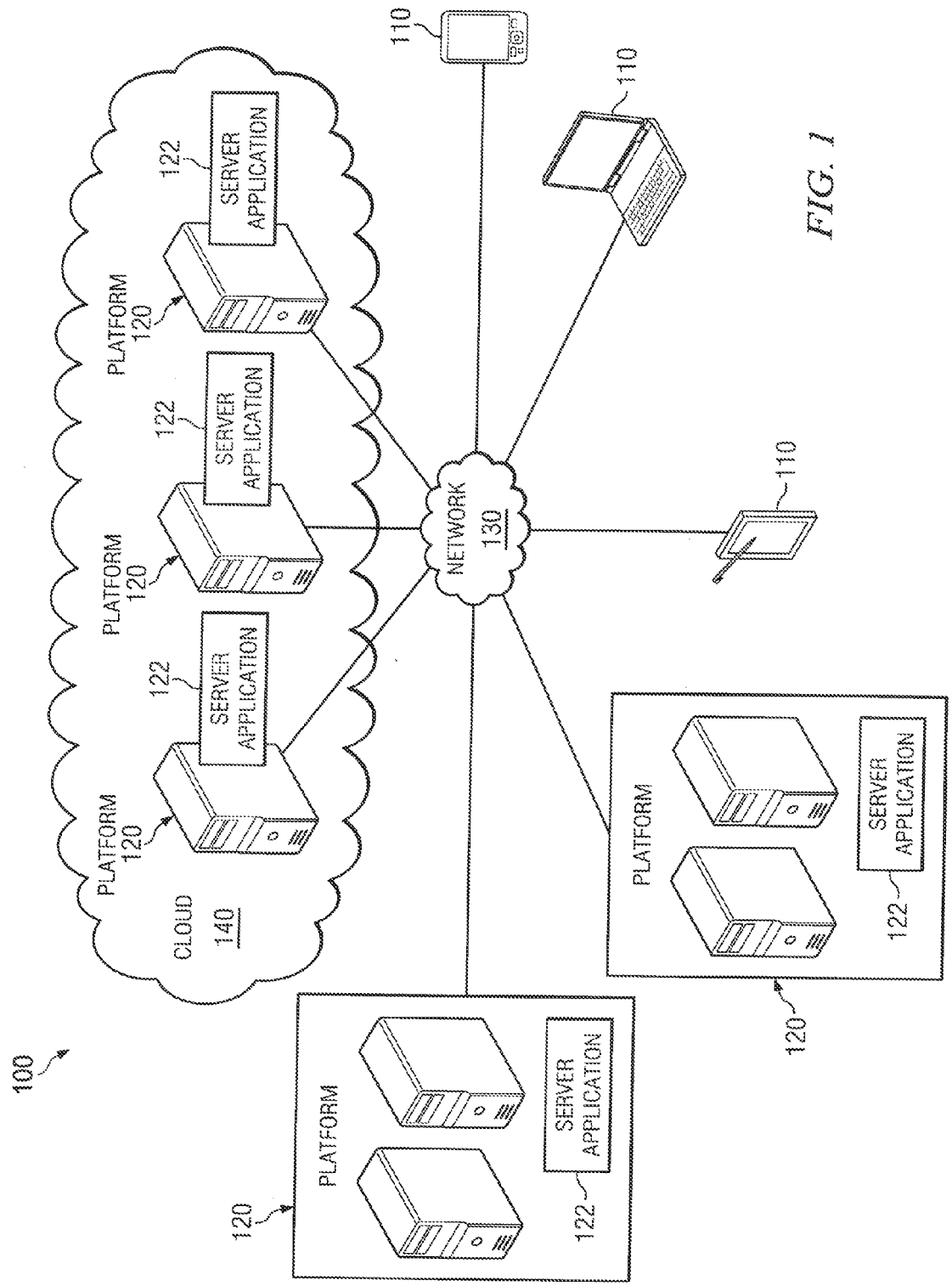
FIG. 1 depicts a block diagram illustrating one embodiment of a topology of a network.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network. In an embodiment, the database may be located on the same physical hardware as a platform server, and may be accessed locally through protocols such as but not limited to open database connectivity (ODBC).

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, or any other programming or scripting code. In an embodiment, HTML may utilize JavaScript to provide a means of automation and calculation through coding. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

In recent years the increasing prevalence of applications for mobile devices has led to greater amounts, and more varied amounts, of data traffic communicated through networks and a greater load on the platforms that support these applications.

Different applications may have different usage profiles, and for certain applications it may be difficult to determine how many users may choose to use a mobile application at any given time. For certain applications, the number of users may range from a few hundred users to hundreds of thousands of users. Issues may therefore arise when there are more users desiring to utilize an application than a platform will support, when trying to efficiently determine a number of platforms to support an application, or when routing users to platforms.

Embodiments disclosed herein provide for a distribution manager that selects a platform to support an application, diverts an application to another platform or delivers a message that there are currently no other available platforms, and efficiently manages the loads of platforms supporting an application, instantiates new platforms supporting the application or deprecates platforms supporting the application.

Accordingly, the distribution manager may be a fully automated system that can dynamically and efficiently deploy and deprecate platforms for mobile applications and dynamically route those applications to the various deployed platforms to achieve a variety of desired goals, including for example, load balancing, lower cost, better service, enhanced security, licensing controls, efficient application updates, disaster recovery, or a wide variety of other goals.

Before turning to specific embodiments as disclosed herein, a general discussion of platforms supporting mobile applications may prove useful. FIG. 1 depicts one embodiment of topology 100 used for the deployment of an application on a mobile device 110.

The topology 100 includes one or more mobile devices 110 connected to one or more platforms 120 over a network 130.

The network 130 may be a wired or wireless network such as the Internet, an intranet, a LAN, a WAN, a cellular network, another type of network. It will be understood that network 130 may be a combination of multiple different kinds of wired or wireless networks.

Mobile devices 110 may be smart phones, laptop computers, personal data assistants or any other type of device that can process instructions and connect to network 130 or one or more portions of network 130.

Each platform 120 may be a general platform server that is capable of supporting multiple server applications 122 (which may be one or more modules), and each platform 120 may include one or more server applications 122 addressable at a single location. The server applications 122 of a particular platform 120 may be deployed on physical computing devices residing at a particular location (such as those associated with the provider of a particular mobile application) or may be deployed in a cloud 140.

Cloud 140 may be, for example, a cloud such as the Amazon Elastic Compute Cloud (EC2). Thus, when a platform 120 is deployed in the cloud 140, the server application(s) may be executing on a virtual machine provided in the cloud, where the virtual machine is addressable at a single location.

Regardless of the location of the platform 120, the server applications of a platform 120 may be used to support one or more applications 112 deployed on a mobile device 110. More specifically, an application 112 deployed on a mobile device 110 may contact a particular platform 120, in return the platform 120 returns content or other data to the application on the mobile device 110 where it may be rendered for presentation to the user, or used in other functionality performed by the application on the mobile device 110. The application on the mobile device, in turn, may filter content, render content for presentation to the user, or be used in other functionality performed by the application 112 on the mobile device 110.

As discussed above, the increasing prevalence of applications, including those for mobile devices, has led to greater, and more varied, amounts of data traffic communicated through networks and a greater load on the platforms that support these applications. Furthermore, different applications may have different usage profiles.

Platforms that support mobile application may, however, have a finite capacity (for example, in total number of applications simultaneously connected to the platform or requests from applications that can be simultaneously serviced, etc.). This capacity may be exceeded, especially in times of high demand. However, it as an inefficient and perhaps costly use of resources to deploy additional platforms to support peak usage of the application if those platforms will be underutilized once the peak demand subsides. Furthermore, the deployment of additional platforms does nothing to protect against the failure of a platform. If a mobile application is configured to contact a particular platform and the platform fails, all the mobile applications configured to contact that platform may be without service. Accordingly, among other things, it is desired to dynamically and efficiently deploy and deprecate platforms for a mobile applications and dynamically route those applications to the various deployed platforms to achieve a variety of desired goals, including for example, load balancing, lower cost, better service, enhanced security, licensing controls, efficient application updates, disaster recovery, or a wide variety of other goals.

Attention is thus directed to embodiments of systems and methods for a distribution manager. More specifically, embodiments of such a distribution manager may maintain a list of deployed platforms associated with mobile applications. As understood in this disclosure the term platform may refer to a deployed mobile application and the platform servers supporting that deployed mobile application.

In one embodiment, the distribution manager may serve as a contact point for deployed mobile applications. When contacted by a mobile application the distribution manager may return a particular platform server to the application based on a variety of criteria. The application can then contact that platform server to obtain service. The distribution manager may maintain a measure of the load on the deployed platform servers(e.g., number of users in total on each platform server, maximum on a particular platform server, number of users currently on every or one or more of the deployed platform servers, etc.) and deploy additional platform servers to support that application or deprecate currently deployed platform servers based on this load measure. It will be noted that the distribution manager may simultaneously perform these operations for multiple different deployed platforms.

Figure 2A:
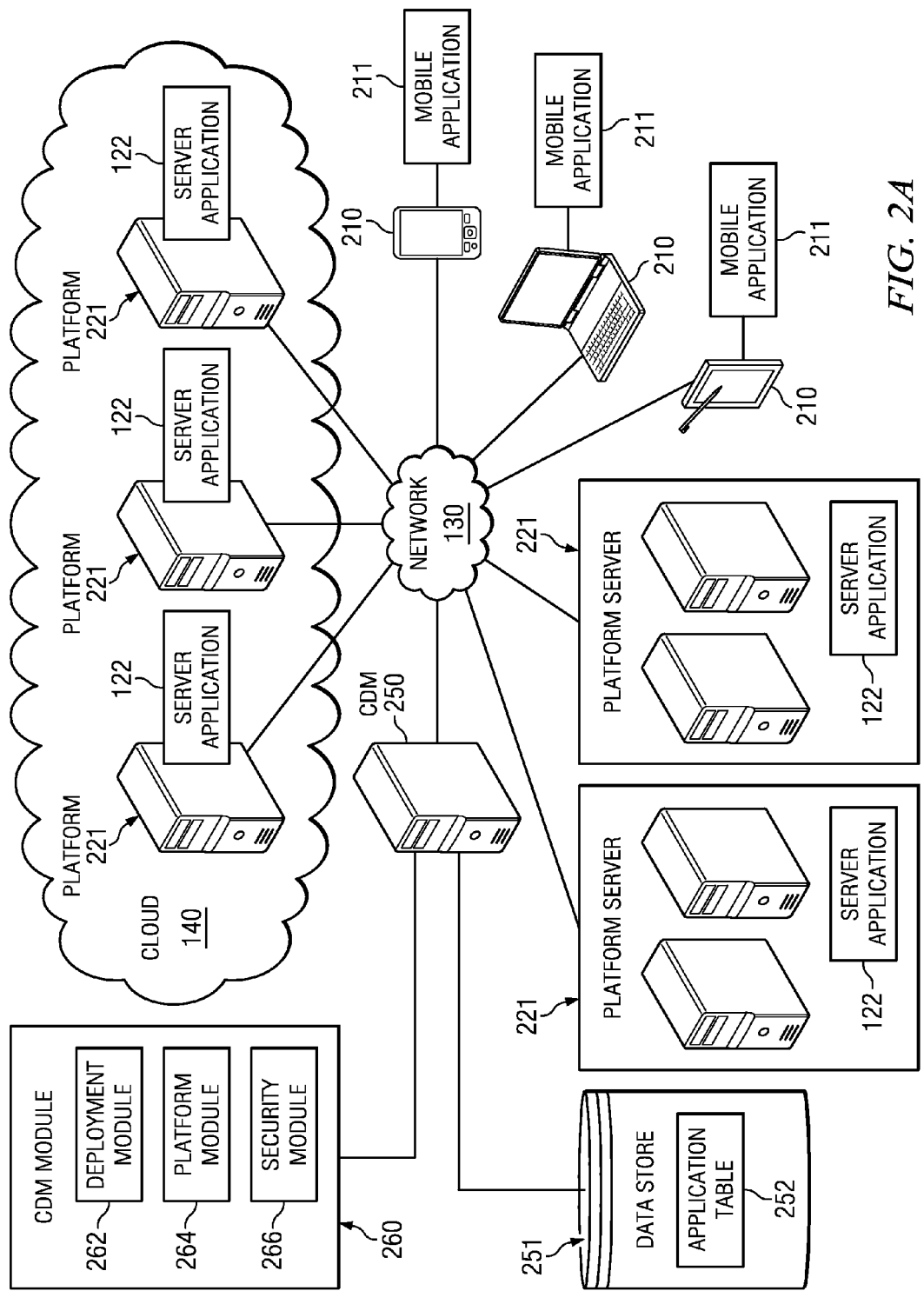
FIG. 2A depicts a block diagram illustrating one embodiment of a topology of with a distribution manager.

Moving now to FIG. 2A, one embodiment of a topology for the deployment of a mobile application 211 that includes a distribution manager 250 is depicted. The mobile application 211 may be appropriately configured to execute on mobile device 210 on which it is deployed and comprise an interface for interacting with the mobile application 211 or the mobile device 210.

Platform server 221 may be a multi-tenant server configured to communicate with any number of integrated servers. Each platform server 221 may be associated with at least one application 211. Platform server 221 may support a mobile application 211 as well as provide content to be displayed by mobile application 211. Platform server 221 may simultaneously host a plurality of mobile applications 211 associated with different servers.

Distribution manager 250 comprises one or more server applications (e.g., modules) accessible over a network(e.g., using HTTP or another protocol) that may implement the functionality discussed here. The distribution manager 250 may be deployed in the cloud 140 (e.g., on a virtual machine in the cloud 140) or be deployed on one or more platform servers 221 associated with the site of a provider of the mobile application 211. Hereinafter, the distribution manager 250 will be referred to as a cloud distribution manager (CDM), it will however be understood that this nomenclature is utilized solely for the sake of convenience and that any and all functionality discussed with respect to the CDM 250 may be applied to a distribution manager regardless of location. However, in many cases it may be desirable to deploy the distribution manager 250 in cloud 140 as this may alleviate the effect of any connectivity issues that may affect platforms servers 221 deployed at a provider's site. It may also be possible to have multiple deployed distribution managers (e.g., one in the cloud 140 and one at a provider's site).

CDM 250 may include CDM module 260 and data store 251. CDM module 260 may include deployment module 262, platform module 264 and security module 266.

Deployment module 262 may be configured to access an application table 252 stored on data store 251 and determine a platform server 221 for a mobile application 211 based on a variety of criteria.

Platform module 264 may be configured to instantiate new platforms supporting an application or deprecate platforms supporting the application.

Security module 266 may be configured to implement security in conjunction with the CDM 250.

Data store 251 may be a file store, database, memory or some other storage medium configured to store data. In data store 251, CDM 250 may maintain an application table 252 associated with a mobile application 211 deployed on mobile devices 210.

This application table 252 may comprise a set of deployed platform servers 221 that support the mobile application 211. Additional information may also be stored in association with the deployed platforms such as the name of the application 211 deployed on mobile device210, the operating system (OS) associated with the mobile device 210 executing application 210, a geographic location associated with each platform server 221 or the source IP address of the application 211 deployed on mobile device 210. The application table 252 may also have other information such as connectivity data (e.g., IP or http address, port addresses, etc.) of the deployed platform servers 221 that service that application or a status associated with the platform server 221, such as active, deprecated, message, error, etc.

Additionally, the application table 252 may have capacity data associated with each platform server 221. This capacity data may be, for example, the total number of users each platform server 221 can support, the number of users in parallel each platform server 221 can support, the number of users assigned to a particular platform server 221, the number of users currently on a given platform server 221, etc.

This capacity information may be configured manually by, for example, an administrator, or may be determined automatically, for example, by contacting a platform server 221 or having each platform server 221 notify CDM 250 of its current usage at a particular time interval. When a particular user is assigned to a particular platform server 221 the capacity data (e.g., number of users assigned to a platform server 221) may be updated.

In one embodiment, the capacity information may be associated with processing capabilities for platform server 221 and application 211. For example, platform server 221 may be configured to support application 211. As a result of the type of application or the manner in which application 221 is being supported by platform server 221 may cause platform server 221 to reach a utilization metric, which may be associated with processing power, memory, or disk utilization of platform server 221. Based on a total number of users for application 211 assigned to platform server 221 when the utilization metric is reached, platform server 221 may determine the total number of users it can support. Platform server 221 may then deliver the capacity information to CDM 250.

The application table 252 may also have cost information associated with a deployed platform server 221. For example, platform servers 221 that are deployed in the cloud 140 may be expensive as the providers of the mobile application 211 may be charged for their use by the providers of the cloud 140. In contrast, a platform server 221 deployed on the physical servers already owned by the providers of the mobile application 211 may be relatively low cost. Thus, cost information may be associated with a platform server 221. It will be noted that this cost information may be the same as the location of the platform server 221 or other data associated with the platform server 221.

Mobile application 211 may be a module on a mobile device 210 configured to allow an end user to perform an activity, such as accessing or manipulating data, including for example track and display particular news stories, communicate emails, etc. The mobile application 211 may be configured with the location (e.g., such as a Uniform Resource Locator (URL) address) of the CDM 250. The mobile application 211 may thus be configured to contact CDM 250 based on one or more conditions. For example, the mobile application 211 may be configured to contact the CDM 250 on initial startup of the mobile application 211, every time the mobile application is started or executed, after the expiration of a certain time period(e.g., 7 days, every day, etc.), when connectivity issues occur with a platform server 221, some combination thereof, or based on some other condition or criteria, etc.

In one embodiment, then, when a mobile application 211 initially started for the first time (e.g., after installation) it may contact the CDM 250, where the contact may be, for example, a request including data such as an identifier of the mobile application 211, the name of the application 211 deployed on mobile device 211, the operating system (OS) associated with the mobile device 210 executing application 211, a language associated with the mobile device 210, geographical information of the mobile device 210, the source IP address of the application 211 deployed on mobile device 210 or other data.

In return, the CDM 250 may access the application table 252 and determine a platform server 221 for the mobile application 211 based on a variety of criteria. In one embodiment, deployment module 262 may determine a platform server 221 associated with the application 211 based on one or more criteria associated with the capacity of each of the deployed platform servers 221 in the application table 252 associated with the application 211. The determined platform server 221 can be returned to the application 211 where it may be stored and utilized by the application 211.

Specifically, in one embodiment, the CDM module 260 may pass the IP address and ports of the selected platform server 221 back to mobile application 211. The mobile application 211 can then contact the selected platform server 221 for service (e.g., to provide content or other data to the mobile application 211). Deployment module 260 may then deliver an instruction to add the details associated with the selected server 221 and the mobile application 210 assigned to the selected platform server 221 to the application table 252. The selected platform server 221 to support the mobile application 211 may be selected by the CDM module 260 according to a wide variety of criteria.

In one embodiment, deployment module 262 may select the platform server 221 based on one or more criteria associated with the capacity of each of the deployed platform servers 221 in the application table 252. For example, the percentage of total capacity of users currently assigned to the platform or a percentage of the current capacity available at the platform server 221.

In another embodiment, deployment module 262 may determine the platform server 221 based on one or more criteria associated with the cost of each of the deployed platform servers 221 in the application table 252. For example, a low cost platform server 221 may be determined for a mobile application 211, if the low cost platform server 221 still has capacity regardless of the number of users on that platform server 221 or higher cost platform servers 221.

In one embodiment, deployment module 262 may determine a platform server 221 based on the nearest (either geographically or logically) available platform server 221 to the mobile device as determined by the location of the platform servers 221 and the location information for the mobile device 210 received in the request. Deployment module 262 may determine the location of the platform servers 221 via the application table 252. Deployment module 262 may determine which available platform server 221 is closest to the location information delivered in the request. Then, deployment module 262 may select the closest platform server 221 to the mobile device 210.

In another embodiment, deployment module 262 may determine a platform server 221 based on the language associated with the mobile device 210 or mobile application 211. In this example, deployment module 262 may access the application table 252 to determine if a platform server 221 supports the language of the mobile device 221 that delivered the request. If so, deployment module 262 may select a platform server 221 supporting the language of the mobile device 210.

In another embodiment, deployment module 262 may determine a platform server 221 based on the version number associated with the mobile application 211. In this example, deployment module 262 may access the application table 252 to determine if a platform server 221 supports the version number of the mobile application 211 delivered in the request. If so, deployment module 262 may select a platform server 221 supporting the version number of the mobile application 211. In this embodiment, the platform server 221 supporting the version number of the mobile application 211 may be specifically configured to support the version number of the mobile application 211.

In another embodiment, deployment module 262 may select a platform server 211 based on the OS of the mobile device 210. In this example, the application table 252 may be accessed by deployment module 262 to determine if a platform server 221 supports the OS of the mobile device 211 delivered in the request. If so, deployment module 262 may select a platform server 221 supporting the OS of the mobile device 210. In this embodiment, the platform server 221 supporting the OS of the mobile device 210 may be specifically configured to support the OS of the mobile device 210.

In view of the above, one skilled in the art will appreciate that deployment module 262 may determine a platform server 221 based on almost any criteria or combination of criteria desired, including for example, any information associated with the mobile device 210, application 211 and/or platform server 221, etc.

As mentioned above, once a platform server 221 is determined for the mobile application 211 it may be returned to the mobile application 211 and the mobile application 211 can then contact the selected platform server 221 for service (e.g., to provide content or other data to the mobile application 12). The mobile application 211 may continue to contact the selected platform server 221 for service up until the occurrence of one or more conditions such as a time period having elapsed since the mobile application last contacted the selected platform server 221 or CDM 250, connectivity with the selected platform server 221 cannot be established, or the occurrence of another condition. At such a point, then, mobile application 211 may contact CDM 250, and the deployment module 262 may access the application table 252 and determine if the mobile application 211 should continue to contact the selected platform server 221 or a new platform server 221.

In one embodiment, when the mobile application 211 first contacts the CDM 250, the mobile device 210 executing the application 211 may also be provided with a cloud identifier. The cloud identifier may be a unique identifier that is not reset, and may persists even if the mobile device is later directed to a different platform. The cloud identifier may be used to store user settings associated with the application, such as refresh rates, display settings, etc., such that if the mobile application 211 is later diverted to another platform server 221, the other platform server 221 may include the user's preferences. Data store 251 may be updated to include a mapping of the cloud identifier and a user's preferences.

Turning now to creating and deprecating platforms, in one embodiment, if a certain threshold is exceeded (e.g., user capacity on one computing device, all computing devices of a platform server 221, etc., platform module 264 may create or provision a new platform server 221. In another embodiment, platform module 264 may create a new platform based on historical data or when the number of users on a platform server 221 is within some distance of a threshold user capacity. For example, based on adoption rates associated with a platform server 221, platform module 264 may predict when the threshold is to be exceeded and create a new platform server 221 when it is predicted that the threshold will be exceeded.

This creation may be done by CDM 250 contacting cloud 140 to obtain a virtual machine of cloud 140, obtain connectivity data associated with a virtual machine or provide the data to the virtual machine needed to support the mobile application 211. In one embodiment, platform module 264 may communicate a request to cloud 140 to provision a platform server 221 to support a number of users using an application 211. Then, based on the request, platform module 264 may deploy a new platform server 221 to support application 211, obtain the connectivity details associated with the platform server 221, add these details to application table 252, and indicate that the status of the new platform server 221 is available.

Platform module 264 may also create a platform server 221 for the application 211 by contacting a deployed platform server 221 used to support another mobile application, assigning this platform server 221 to support mobile application 211(instead of, or in addition to, the mobile application it is currently supporting) and providing the data needed to support the mobile application 211 (or a location where the newly created platform server 221 can get this data).

In one embodiment, platform module 264 may create a platform server 221 based on the location of the mobile device 210 executing the mobile application 211. The mobile application 211 may pass the location of the mobile device 210 in a communication to the CDM 250. If the mobile device 210 is in a location that is remote from a currently deployed platform server 221, or there are a threshold number of users in a certain geographic area, platform module 264 may deploy a platform server 221 to support the mobile application 211 that is proximate (or within) the geographic area. Thus, service to users in or near that geographic may be improved. In other embodiments, new platform servers 211 may be created based on thresholds associated with a version number of the application 211, an OS of the mobile device 220 that application 211 is deployed on, a language associated with the application 211, etc.

Platform module 264 may then add the details associated with a newly created platform server 221 to the application table 252 and the mobile applications 210 assigned to this newly created platform server 221.

During any subsequent interaction with the selected platform server 221, mobile application 211 may encounter an issue with that platform server 221 (e.g., the platform server 221 failed, capacity is exceeded, excessive delay, etc.). The mobile application 211 may contact the CDM 250 to be re-assigned to a different platform server 221 when such an issue is encountered.

In one embodiment, when the mobile application 211 reconnects with the CDM 250 the mobile application 211 may provide details as to the failure encountered with the previously assigned platform server 221 (e.g., the data originally provided by the CDM 250, the platform server 221 it was attempting to contact, the application identifier, etc.). CDM 250 may use this data for a variety of purposes, for example, it may send a message to the mobile application 211 or may mark the platform server 221 deprecated in the application table 252 such that it is not assigned to any mobile application 211 (as will be discussed in more detail later). In another embodiment, upon mobile application 211 providing CDM 250 with details as to the failure encountered with the previously assigned platform server 221, CDM 250 may flag the status of the platform server 221 within application table 252 to indicate there is a defect with the platform server 221.

If no issues are encountered during a certain time period, the mobile application 211 may contact the CDM 250 after the expiration of that time period and provide details on the previously assigned platform server 221(e.g., the data originally provided by the CDM 250, the platform server 221 connectivity details, the application identifier, etc.). At this point the CDM 250 may reply with a response to the application 211 indicating the application should continue to use that platform server 221 or may reassign the mobile application 211 to another platform server 221.

This feature may be useful in the deprecation of platform servers 221. For example, as discussed above, new platform servers 221 may be deployed by platform module 264 for a number of reasons. It may, however, not be desirable to keep the platform servers 221 deployed, especially in the case when they are underutilized and high cost. Thus, in such cases the platform server 221 may be marked as deprecated (manually by an administrator or by an algorithmic determination carried out by the CDM 250) in the application table 252.

Accordingly, when a mobile application 211 contacts the CDM 250 if it is currently being serviced by a deprecated platform server 221 then it may be re-assigned to another platform server 221. Additionally, no new mobile applications 211 may be assigned to that platform server 221. As all mobile applications 211 are configured to contact the CDM 250 after the expiration of the same time period, it can be virtually guaranteed that when a status of a platform server 221 is marked as deprecated within application table 252, no mobile applications 211 may be assigned to that platform server 221 after the expiration of that time period. These deprecated platform servers 221 can then be taken offline, and that status of the platform servers 221 can be indicated as depreciated within the application table 252.

The CDM 250 may also be used for a number of other purposes. For example, the CDM 250 may be used to send messages to mobile devices 210 assigned to a particular, or some set of, deployed platform servers 221. In one embodiment, a status of a platform server 221 may be marked as "message" in the application table 252 and a message sent to mobile applications 211 to contact the CDM 250 and provide connectivity information associated with that platform server 221. When such a mobile application 211 does contact the CDM 250, this message may be delivered to the mobile application 211.

Similar methods may be performed to provide an application update to the mobile application 211. For example, in one embodiment, CDM module 260 may be used to update application 211. When a mobile application 211 communicates with CDM 250, CDM module 260 may access application table 252 to determine if the most up-to-date version of mobile application 211 is deployed on mobile device 210. If the most up to up-to-date version of mobile application 211 is not deployed on mobile device 210, CDM module 260 may communicate an update of the mobile application 211 to mobile device 210 and correspondingly update application table 252.

In another embodiment, as the CDM 250 may be a central contact point for mobile applications 210 it may be useful to implement security in conjunction with the security module 266. To implement such security, a device identifier (EMEI, id number of SIM card, etc.) associated with mobile devices 210 that are to be allowed to access a mobile application may be stored at the data store 251 in association with the application 211 (e.g., in a table associated with the application table). When a mobile application 211 contacts the CDM 250 they may provide the identifier of the device 210 on which it is executing. Security module 266 may match the provided identifier with the stored identifiers to determine whether to assign a platform server 221 to that mobile application 211 (and thus whether to support that instance of the mobile application). If the identifier of the device 210 is not provided to the CDM 250, security module 266 may block the mobile application from accessing a platform server 221. In an embodiment, the device identifier may be a security certificate that may be stored locally on mobile device 210 in the form of a file or other data structure.

In another embodiment, security module 266 may manage licenses assigned to a mobile application 211. A mobile application 211 may have a certain number of available licenses that it may be able to support, and once a license capacity has been exceeded no new users of the mobile application may be supported. When a client contacts the CDM 250, security module 266 may access application table 252. Then, security module 266 may sum the total number of users assigned to all the platforms servers 221 supporting the mobile application 211. Security module 266 may compare the sum of the total number of users assigned to all the platforms to a licensing capacity. If the number of users assigned to all the platform servers 221 does not exceed the licensing capacity, deployment module 262 may select a platform server 221 for the mobile application 211.

As can be seen then, embodiments as depicted herein may provide on-demand load balancing as load balancing may be dynamically accomplished as mobile applications 211 contact the CDM 250 or as platform servers 221 fail or are created and deprecated. As the location of the CDM 250 may be a central contact point and contact is only done on initial startup, every time the mobile application is started or executed, once every time period, etc., this load balancing may be performed without interposing a device between a mobile application 211 and a platform server 221 every time the mobile application 211 contacts the platform server 221 (as in traditional load balancing). Thus, this dynamic load balancing may also be accomplished using lower cost machines. In one embodiment, CDM 250 may perform load balancing of platform servers 221 supporting mobile application 211 based on a number of assigned mobile applications 211 to a platform server 221, a percentage of applications 211 assigned to a platform server 221 that the platform server 221 can support, language of application 211, location of mobile device 210, version number of application 211, etc. For example in one embodiment of load balancing, CDM 250 may determine a number of assigned mobile applications 210 to each platform server 221, order the platform servers 221 based on the number of assigned mobile applications 211, and the next mobile application 211 requesting support from a platform server210 may be assigned the platform server 221 with the fewest assigned mobile applications 211.

FIG. 2B depicts an embodiment of a method 270 for the deployment of a mobile application using a distribution manager 250.

At step 272, a request may be received from a mobile device for support for a mobile application. The request may include, for example, one or more of an identifier of the mobile application, the name of the application deployed on mobile device, the operating system (OS) associated with the mobile device executing application, language of the application, version number of the application, a location of the mobile device (which may be obtained by any known means such as GPS, WiFI database lookup, radio direction finding, etc.), the source IP address of the application deployed on mobile device, or other information.

In return, at step 274, an application table may be accessed, and an available platform server to support the mobile application associated with the request may be determined based on one or more criteria. In one embodiment, the platform server may be determined based on one or more criteria associated with a capacity of each of the deployed platform servers in the application table. For example, the application table may be accessed to determine a percentage of total capacity of users currently assigned to each platform server supporting the application. The platform server with the lowest percentage of total capacity users may be selected.

One skilled in the art will appreciate a platform server may be selected based on almost any criteria or combination of criteria desired, including for example, any information associated with the mobile device, application or platform server, etc.

Upon determining a platform server, connectivity information, such as the IP address and ports of the determined platform server may be determined based on the connectivity details of the selected platform server in the application table.

At step 276, connectivity information for the determined platform server can be delivered to the application where it may be stored. Specifically, in one embodiment, the IP address and ports of the determined platform server may be delivered to the mobile application associated with the request.

At step 278, the application table may be updated to include the information associated with the mobile application making the request for a platform, capacity data associated with adding the mobile application to be supported by the determined platform server and the details of the determined platform server.

FIG. 2C depicts an embodiment of a method 280 for the deployment of a mobile application using a distribution manager.

At step 282, a mobile application executing on a mobile device may contact a CDM via an address, such as a URL address, of the CDM. The mobile application may contact the CDM on initial startup of the mobile application, after the expiration of a certain time period (e.g., 7 days, every day, etc.), every time the mobile application is started or executed, when connectivity issues occur with a platform, some combination thereof, or based on some other condition or criteria, etc.

The mobile application may contact the CDM after installation, where the contact may be, for example, a request including data such as an identifier of the mobile application, the name of the application deployed on the mobile device, the operating system (OS) associated with the mobile device executing the application, a language associated with the mobile device, geographical information of the mobile device, the source IP address of the application deployed on the mobile device or other data.

At step 284, details associated with a selected platform server to support the mobile application may be received. Specifically, the IP address and ports of the selected platform server may be received. The selected platform server may be determined based on a variety of criteria. The selected platform server may be determined based on almost any criteria or combination of criteria desired, including for example, any information associated with the mobile device, application and/or platform server, etc.

At step 286, the details associated with the selected platform server to support the mobile application may be stored in a memory accessible by the mobile application. The stored details may include the IP address and ports of the selected platform server.

At step 288, the mobile application may contact the selected platform server for service to use the mobile application. The platform server may provide content or other data to the mobile application.

At step 290, it may be determined if a time period has elapsed since the mobile application last contacted the CDM. In one embodiment, the time period may be any length of time such as 7 days, every day, etc. If it is determined at step 290 that the time period has elapsed since the mobile application last contacted the CDM, then the mobile application may return to step 282 and contact the CDM.

If it is determined at step 290 that the time period has not elapsed since the mobile application last contacted the CDM, then at step 292 it may be determined if there is an error in connectivity between the mobile application and the selected platform. It may be determined that there is an error in connectivity between the mobile application and the selected platform server if connectivity with the selected platform server cannot be established due to, for example, platform failure, exceeding the capacity of the selected platform server excessive delay, etc.

If it is determined at step 292 that there is an error in connectivity between the mobile application and the selected platform, then the mobile application may return to step 282 and contact the CDM. If it is determined at step 292 that there are no errors in connectivity between the mobile application and the selected platform, the mobile application may continue to contact the selected platform for service and return to step 288.

Figure 3B:
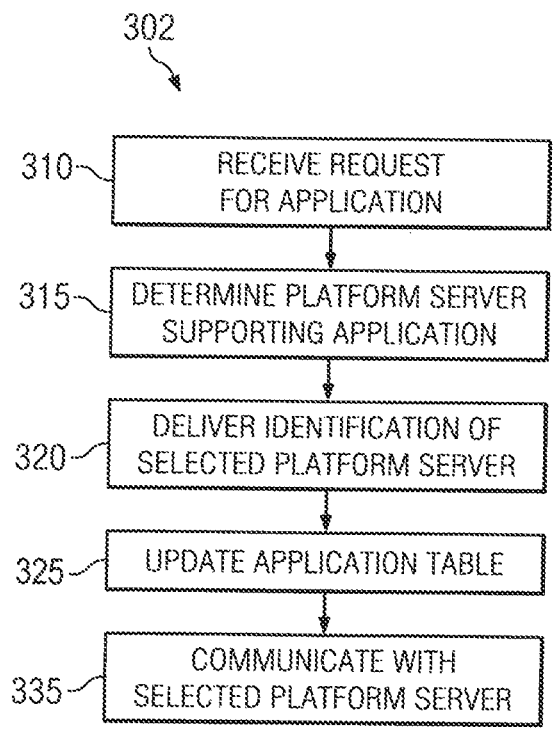
FIG. 3B depicts an embodiment of a method utilized by a distribution manager for directing applications to a platform.

Turning now to FIGS. 3A and 3B, a block diagram 301 (FIG. 3A) and a method 302 (FIG. 3B) of a mobile application for a mobile device 305 being directed to a platform 321 by CDM 350 is depicted according to one embodiment. Elements of FIG. 3A may be similar to the elements described above and thus may not be explained in more detail.

At step 310, a request may be received from a mobile device for support for a mobile application. The request may include an identifier of the mobile application, the name of the application deployed on the mobile device, the operating system (OS) associated with the mobile device executing the application, the language of the application, the version number of the application, a location of the mobile device (which may be obtained by any known means such as GPS, WiFi database lookup, radio direction finding, etc.) and/or the source IP address of the application deployed on mobile device.

In response, at step 315, an application table may be accessed, and an available platform server to support the mobile application associated with the request may be selected based on a variety of criteria. In one embodiment, the platform server may be selected based on one or more criteria associated with a capacity of each of the deployed platform servers in the application table. For example, the application table may be accessed to determine a percentage of total capacity of users currently assigned to each platform server supporting the application. The platform server with the lowest percentage of total user capacity may be selected.

In one embodiment, the selected platform server may be based on the nearest available platform to the mobile device as determined by the geographic location of the platform servers and the location information received in the request. The application table may be accessed to determine which available platform server is closest to the location information delivered in the request. Then the closest platform server to the mobile device may be selected.

In another embodiment, a platform server may be selected based on the language associated with the mobile device. In this example, the application table may be accessed to determine if a platform server supports the language of the mobile device delivered in the request. If so, a platform server supporting the language of the mobile device may be selected.

One skilled in the art will appreciate a platform server may be selected based on almost any criteria or combination of criteria desired, including for example, any information associated with the mobile device, application and/or platform server, etc.

Upon selecting a platform server, connectivity information, such as the IP address and ports of the selected platform server, may be determined based on the connectivity details of the selected platform server in the application table.

At step 320, connectivity information for the selected platform server can be delivered to the mobile application where it may be stored. Specifically, in one embodiment, the IP address and ports of the selected platform server may be delivered to the mobile application associated with the request.

At step 325, the application table may be updated to include the information associated with the mobile application making the request for a platform, capacity data associated with adding the mobile application to be supported by the selected platform server and the details of selected platform server.

At step 335, the mobile application can then contact the selected platform server for service (e.g., to provide content or other data to the mobile application) using the connectivity information for the selected platform.

The mobile application may continue to contact that platform server for service up until 1) a time period has elapsed since the mobile application last contacted the CDM 350, 2) connectivity with platform server cannot be established, or 3) the mobile application is started or executed again. At this point, the mobile application may reconnect with the CDM 350.

Figure 4A:
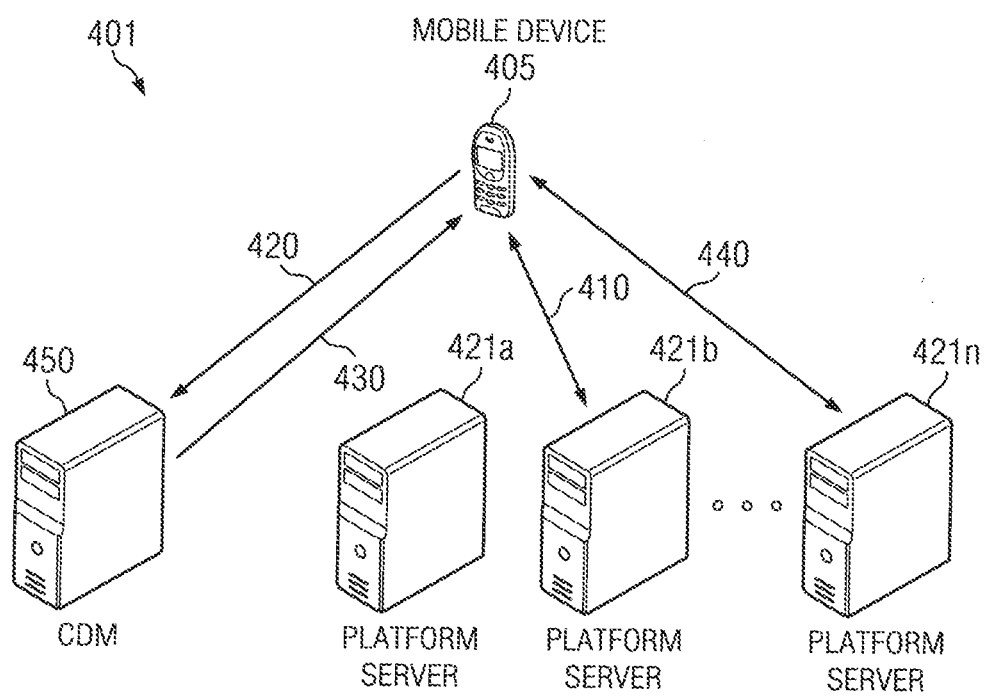
FIG. 4A depicts a block diagram illustrating one embodiment of a topology with a distribution manager.
Figure 4B:
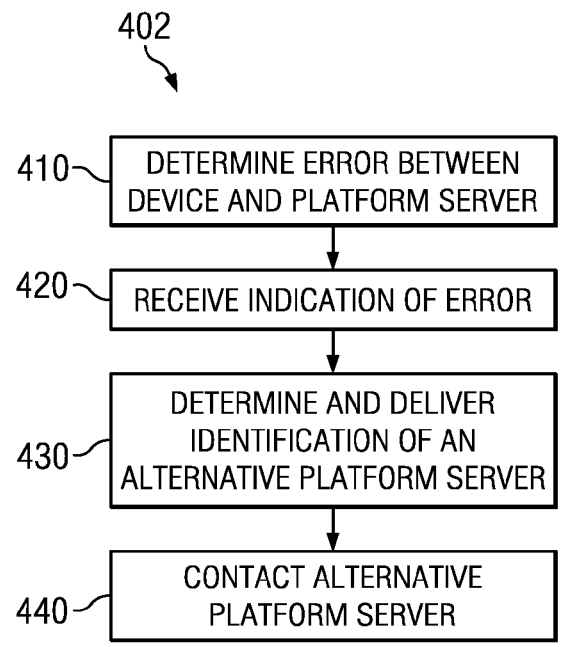
FIG. 4B depicts an embodiment of a method utilized by a distribution manager for directing applications to a platform.

Turning now to FIGS. 4A and 4B, a block diagram 401 (FIG. 4A) and a method 402 (FIG. 4B) of a mobile application on a mobile device 405 being directed to a platform 421 by CDM 450 is depicted according to one embodiment. Elements of FIG. 4A may be similar to the elements described above and thus may not be explained in more detail.

At step 410, during any interaction with the selected platform server, a mobile application may encounter an issue with that platform server (e.g., the platform failed, capacity is exceeded, excessive delay, etc.).

At step 420, a message that an error was experienced between the mobile application and platform server may be received. The message may be a request to be re-assigned to a different platform server. The message may include details of the failure encountered with the previously assigned platform server, and details of the previously assigned platform such as an identifier of the mobile application, the name of the application deployed on the mobile device, the operating system (OS) associated with the mobile device executing the mobile application, the language of the application, version number of the mobile application, the source IP address of the application deployed on the mobile device, and/or the IP address and port number of the platform server it was attempting to contact.

In response, at step 430, an application table may be accessed to determine a different platform server for the mobile application based on a variety of criteria. In one embodiment, the platform server may be selected based on one or more criteria associated with the capacity of each of the deployed platform servers in the application table. For example, the percentage of total user capacity currently assigned to the platform server.

Connectivity information for the selected platform server can be delivered to the application where it may be stored. Specifically, in one embodiment, the IP address and ports of the selected platform server may be delivered to the mobile application associated with the indication of the error. The application table may be updated to include the information associated with the mobile application making the request for a new platform and the selected platform, such as capacity data associated with selected platforms servicing the mobile application.

However, if it is determined that there are no available platform servers that can support the mobile application because each of the current platform servers are at capacity, or any other reason, it may be determined that the mobile application should continue to use the current selected platform for support. Thus, at step 430 a response may be delivered to the mobile application instructing the mobile application to continue to use the currently selected platform server. The response may include the IP address and ports of the current platform server.

At step 440, the mobile application can then contact the selected platform server for service (e.g., to provide content or other data to the mobile application) using the connectivity information for the selected platform server. The mobile application may continue to contact that platform server for service up until, for example, 1) a time period has elapsed since the mobile application last contacted the CDM, 2) connectivity with platform server cannot be established or 3) the mobile application is started or executed again.

Figure 5A:
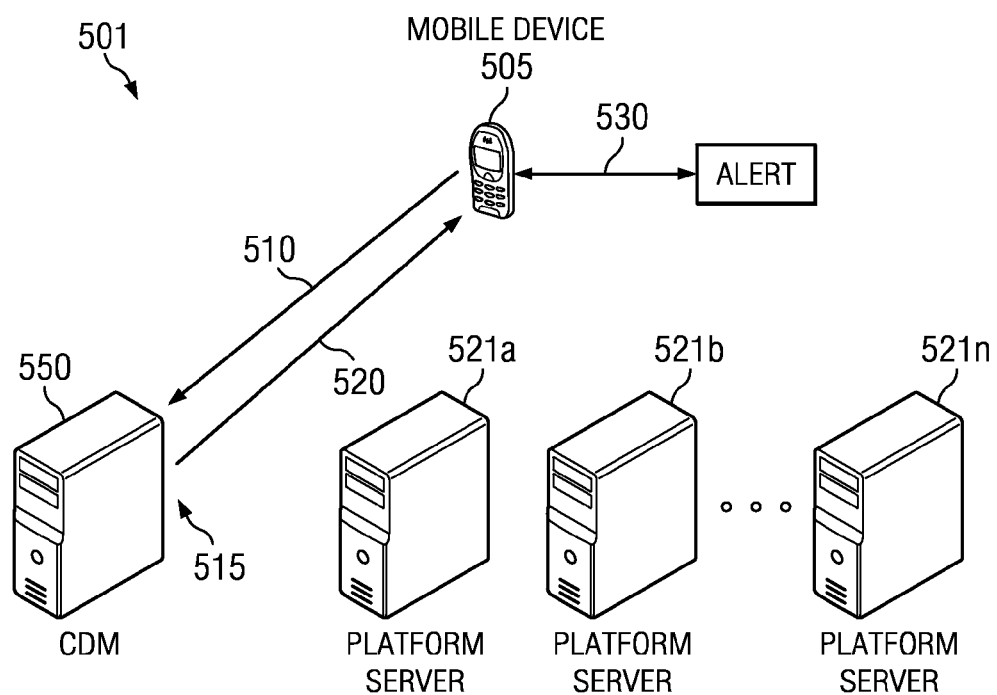
FIG. 5A depicts a block diagram illustrating one embodiment of a topology with a distribution manager.
Figure 5B:
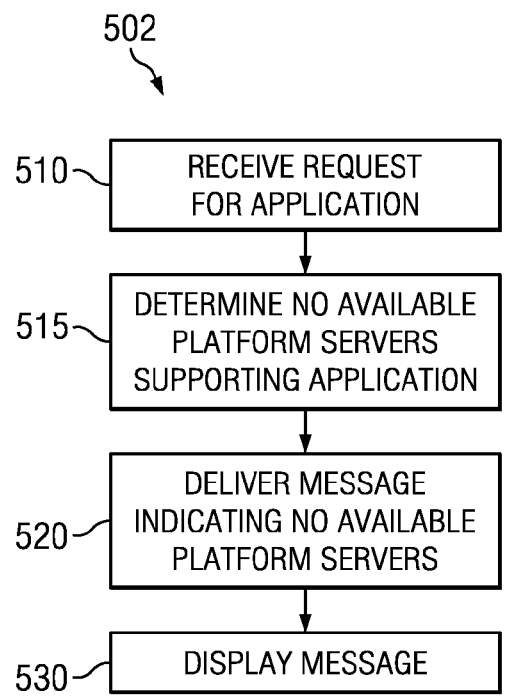
FIG. 5B depicts an embodiment of a method utilized by a distribution manager for indicating that there are no available platforms.

Turning now to FIGS. 5A and 5B, a block diagram 501 (FIG. 5A) and a method 502 (FIG. 5B) of a CDM 550 indicating that there are no platform servers 521 available to service a mobile application on mobile device 505 is depicted according to one embodiment. Elements of FIG. 5A may be similar to the elements described above and thus may not be explained in more detail.

At step 510, a request may be received from a mobile device for support for the mobile application. The request may include an identifier of the mobile application, the name of the application deployed on mobile device, the operating system (OS) associated with the mobile device executing the application, the language of the application, style presentation preferences, the version number of the application, and/or the source IP address of the application deployed on the mobile device.

In response, at step 515, an application table may be accessed, and it may be determined that there are no available platform servers to support the mobile application associated with the request. For example, the application table may be accessed to determine platform servers supporting the requested application. However, upon accessing the application table it may be determined that all of the platform servers supporting the requested application are at capacity.

Thus, it may be determined that platform servers supporting the mobile application do exist, but have a status "message" within the application table. The status "message" entry within the application table for a platform server may indicate that a message should be delivered to the mobile device associated with the mobile application to be displayed to a user. In such an embodiment, the message may be a service message. For example, a service message may state that "The system is currently undergoing scheduled maintenance— Please try again in 30 minutes." In one embodiment, the application table may be accessed to determine the user's local language settings associated with the mobile application sent in the request at step 510. If the language setting received in the request is not recognized, then a default language or message may be used or a language may be determined based on location information sent in the request message. An appropriate language associated with the location of the mobile device may then be used in the message.

At step 520, the service message may be delivered to the mobile application. The service message may be delivered to the source IP address of the application deployed on the mobile device.

At step 530, the service message may be displayed on an interface on the mobile device. In one embodiment, the message may be sent and displayed corresponding to presentation information as indicated in the request message for the mobile application. In an embodiment, after presenting the message on the interface of the mobile device, the application may provide means for the user to exit the mobile application.

Figure 6A:
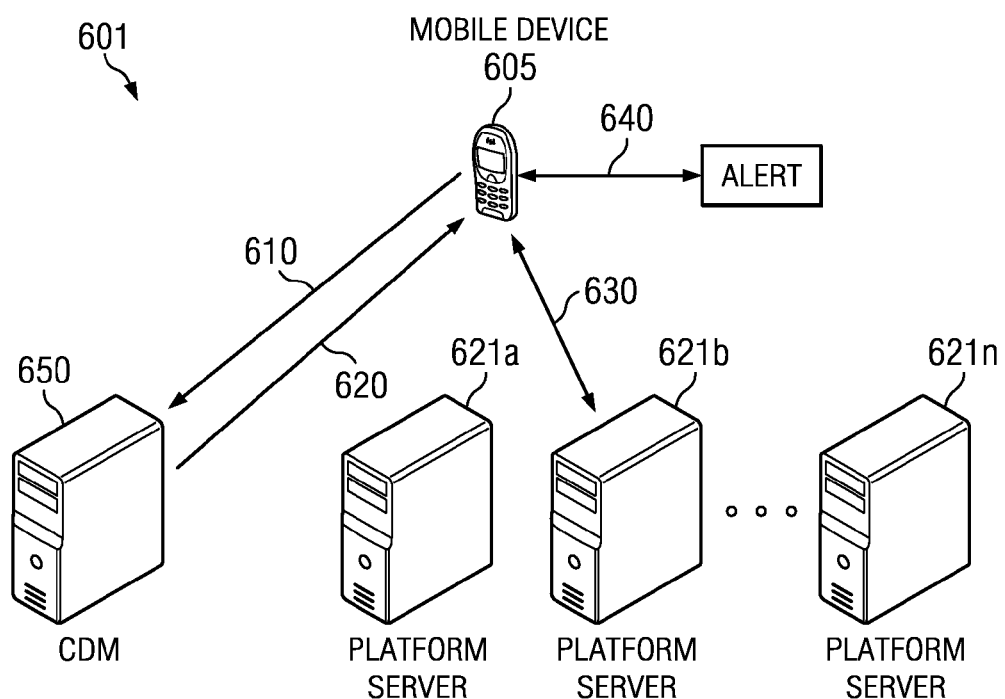
FIG. 6A depicts a block diagram illustrating one embodiment of a topology with a distribution manager.
Figure 6B:
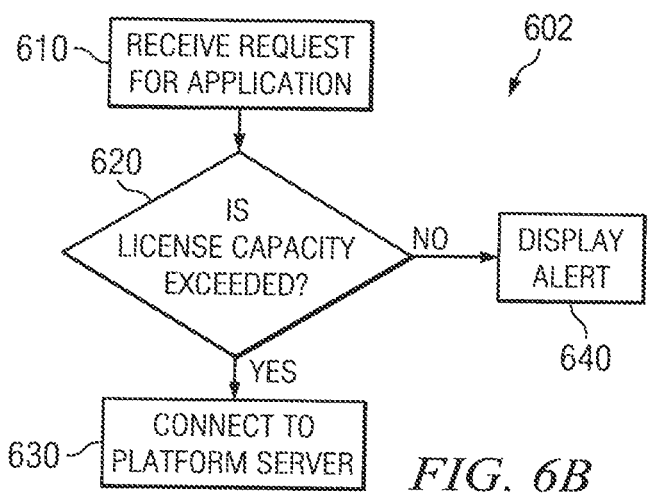
FIG. 6B depicts an embodiment of a method utilized by a distribution manager for directing licensed applications.

Turning now to FIGS. 6A and 6B, a block diagram 601 (FIG. 6A) and a method 602 (FIG. 6B) of a CDM 650 directing a licensed mobile application on a mobile device 605 to a platform server 621 are depicted according to one embodiment. Elements of FIG. 6A may be similar to the elements described above and thus may not be explained in more detail.

At step 610, a request may be received from a mobile device for support for the mobile application. The request may include an identifier of the mobile application, the name of the application deployed on mobile device, the operating system (OS) associated with the mobile device executing the application, the language of the application, style presentation preferences, the version number of the application, and/or the source IP address of the application deployed on mobile device.

In response, at step 620, an application table may be accessed, for example, to determine if the licensing capacity has been exceeded. By accessing the application table, the available platforms servers that support the mobile application, the applications each platform server supports, and the number of users assigned to each application on each platform server may also be determined. Then, the users assigned to all the platform servers supporting the mobile application may be summed. The sum of the total number of users assigned to all the platform servers may be compared to a licensing capacity. The licensing capacity may indicate a total number of users that may be assigned to platform servers supporting the mobile application at a given time.

If the number of users assigned to all the platform servers does not exceed the licensing capacity, the platform server for the mobile application associated with the request may be selected based on a variety of criteria. In one embodiment, the platform server with the lowest percentage of total user capacity currently assigned that supports the application may be selected.

If at step 620 it is determined that the number of users assigned to all the platform servers does not exceed the licensing capacity, then connectivity information for the selected platform server can be delivered to the application where it may be stored. Specifically, in one embodiment, the IP address and ports of the selected platform server may be delivered to the mobile application associated with the request. The application table may be updated to include information associated with the mobile application making the request and the selected platform server.

At step 630, the mobile application can then contact the selected platform server for service (e.g., to provide content or other data to the mobile application) using the connectivity information for the selected platform server. The mobile application may continue to contact that platform for service up until, for example, (1) a time period has elapsed since the mobile application last contacted the CDM, (2) connectivity with platform server cannot be established or (3) the mobile application is started or executed again.

Returning to step 620, if it is determined that the number of users assigned to all the platform servers exceeds the licensing capacity, at step 620 a message can be delivered to the mobile device associated with the mobile application to be displayed to a user. In one embodiment, the message may be a service message. For example, a message may indicate that "There is no available license capacity to support your request."

Then, at step 640, a mobile device may receive the message, and display the text associated with the message. In an embodiment, after presenting the message on a display of the mobile device, the application may provide means for the user to exit the mobile application.

Figure 7A:
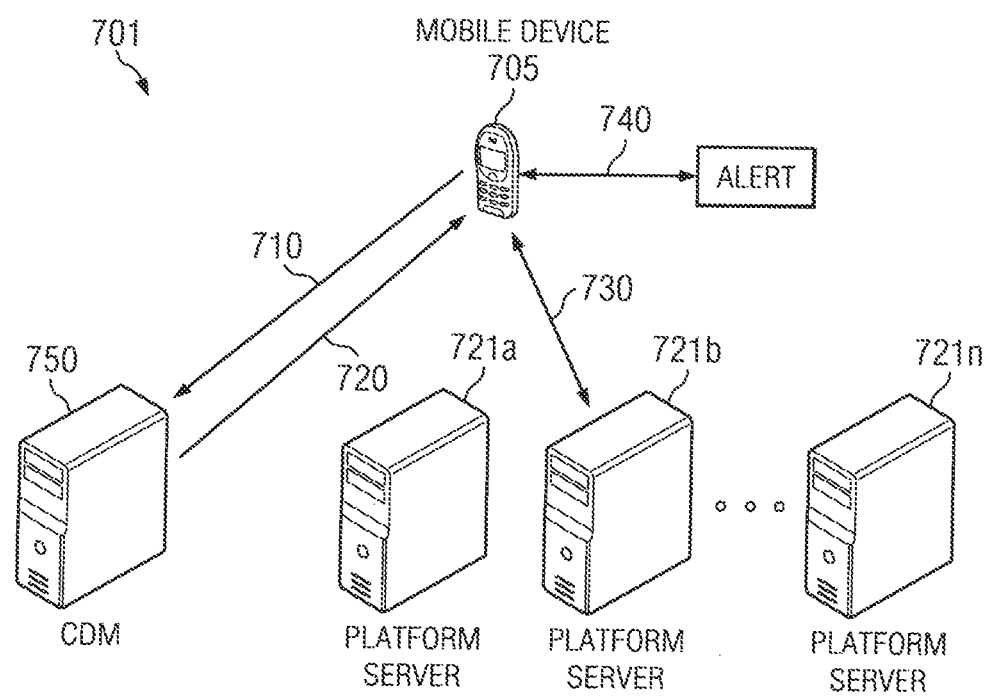
FIG. 7A depicts a block diagram illustrating one embodiment of a topology with a distribution manager.

Turning now to FIGS. 7A and 7B, a block diagram 701 (FIG. 7A) and a method 702 (FIG. 7B) of a security feature of CDM 750 is depicted. Elements of FIG. 7A may be similar to the elements described above and thus may not be explained in more detail.

At step 710, a request may be received from a mobile device for support for a mobile application. The request may include a mobile device identification (such as a phone number, international mobile equipment identity (EMEI), id number of SIM card, etc.), an identifier of the mobile application, the name of the application deployed on the mobile device, the operating system (OS) associated with the mobile device executing application, the language of the application, style presentation preferences, the version number of the application, and/or the source IP address of the application deployed on mobile device.

In response, at step 720, an application table may be accessed to determine access permissions. The application table may be accessed to determine what mobile identifiers are allowed to access which platform servers. If the mobile identification associated with the request matches a corresponding identifier in the application table, it may be determined that the mobile device identification may access a platform server to support an application.

If at step 720 it is determined that the mobile device may access a platform server to support the application, then a platform server designated to support the mobile identifier for the mobile application may be selected.

Connectivity information for the selected platform server can be delivered to the application where it may be stored.

Specifically, in one embodiment, the IP address and ports of the selected platform server may be delivered to the mobile application associated with the request. The application table may be updated to include the information associated with the mobile application making the request for a platform and the selected platform.

At step 730, the mobile application can then contact the selected platform server for service (e.g., to provide content or other data to the mobile application) using the connectivity information for the selected platform. The mobile application may continue to contact that platform server for service up until, for example, 1) a time period has elapsed since the mobile application last contacted the CDM, 2) connectivity with platform server cannot be established, or 3) the mobile application is started or executed again.

Returning to step 720, if it is determined that the mobile device identifier is not associated with a mobile device that may access a platform server to support the mobile application, a message may be delivered to the mobile device associated with the mobile application. The message may be configured to be displayed on a display of the mobile device. For example, a message may indicate that "The mobile device you are using is not authorized to access the services requested. Please contact the help desk." In one embodiment, the message may be sent and displayed corresponding to presentation information as indicated by the request message for the mobile application.

Then, at step 740, a mobile device may receive the message, and display the text associated with the message. In an embodiment, after presenting the message on a display of the mobile device, the application may provide means for the user to exit the mobile application.

FIG. 8 depicts a table 800 illustrating one embodiment of an application table. Looking now at FIG. 8, column 805 represents an identification number of a platform, columns 810 represents a host IP address of the platform, columns 815 and 820 represent port addresses of the platform, column 825 represent an application name supported by the platform, column 830 represent the maximum number of users for the application that the platform can support, column 835 represents the number of currently assigned users to the platform for the application, column 840 may represent the status of the platform, column 845 may be associated with when the platform was created, column 850 represents who authorized the platform to be created, column 855 may be associated with when the platform was updated, column 860 represents who authorized the platform to be updated, column 865 represents a message text to be returned to the application and displayed on the mobile device if the status field of column 840 is set to "message."

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A distribution management system comprising:
a processor communicatively coupled to a network; and
a non-transitory computer-readable medium comprising instructions configured for execution by the processor, which when executed by the processor dynamically assigns a platform server to support an application deployed on a mobile device by:
receiving a request for support from the deployed mobile application,
wherein the deployed mobile application is configured to contact a distribution manager for assignment of a platform server to service the deployed mobile application support request;
determining the platform server to support the deployed mobile application based on capacity data associated with a set of platform servers in an application table associated with the deployed mobile application, wherein the deployed mobile application is configured to connect to the platform server to obtain data for operation of the deployed application on the mobile device;
delivering an identification of the platform server to the deployed mobile application, wherein identification of the platform server comprises network connectivity information configured to allow the deployed mobile application to directly connect to the platform server; and
independently of receiving requests for support, determining the platform server and delivering the identification of the platform server to the deployed mobile application:
accessing the application table and determining if a new platform server should be created or an existing platform server should be deprecated based on the deployed mobile application, create a new platform server if it is determined that a new platform server should be created, and deprecate the existing platform server of the set of platform servers if it is determined that the existing platform server should be deprecated.

2. The system of claim 1, wherein the request for support is received after a time period has elapsed or connectivity between the deployed mobile application and the platform server cannot be established.

3. The system of claim 2, wherein if connectivity between the mobile and the platform server cannot be established, the instructions are configured to determine a new platform server to support the deployed mobile application.

4. The system of claim 1, wherein the capacity data is associated with a total number of users each platform server within the set can support and a number of users assigned to each platform server within the set.

5. The system of claim 1, wherein the instructions are further configured to:
create a new platform server if a capacity threshold associated with the platform server and the capacity data is exceeded.

6. The system of claim 1, wherein the instructions are further configured to:
deprecate a platform server within the set of platform servers based on the capacity data for the set of platform servers.

7. The system of claim 1, wherein the instructions are further configured to:
determine that a version of the deployed mobile application is not the most up-to-date version of the deployed mobile application; and
deliver an update of the deployed mobile application.

8. The system of claim 1, wherein the request includes a device identifier, and the instructions are further configured to:
compare the device identifier with identifiers within the application table to determine whether to assign the platform server to the deployed mobile application.

9. A method for dynamically assigning a platform server to support an application deployed on a mobile device, the method comprising:
receiving a request for support from a deployed mobile application;
determining a platform server to support the deployed mobile application based on capacity data associated with a set of platform servers in an application table associated with the deployed mobile application, wherein the deployed mobile application is configured to connect to the platform server to obtain data for operation of the deployed application on the mobile device;
delivering an identification of the platform server to the deployed mobile application, wherein identification of the platform server comprises network connectivity information configured to allow the deployed mobile application to directly connect to the platform server; and
independently of receiving requests for support, determining the platform server and delivering the identification of the platform server to the deployed mobile application: accessing the application table and determining if a new platform server should be created or an existing platform server should be deprecated based on the deployed mobile application, create a new platform server if it is determined that a new platform server should be created, and deprecate the existing platform server of the set of platform servers if it is determined that the existing platform server should be deprecated.

10. The method of claim 9, wherein the request for support is received after a time period has elapsed or connectivity between the deployed mobile application and the platform server cannot be established.

11. The method of claim 10, wherein if connectivity between the deployed mobile application and the platform server cannot be established, determining a new platform server to support the deployed mobile application.

12. The method of claim 9, wherein the capacity data is associated a total number of users each platform server within the set can support and a number of users assigned to each platform server within the set.

13. The method of claim 9, further comprising:
creating a new platform server if a capacity threshold associated with the platform server and the capacity data is exceeded.

14. The method of claim 9, further comprising:
deprecating a platform server within the set of platform servers based on the capacity data for the set of platform servers.

15. The method of claim 9, further comprising:
determining that a version of the deployed mobile application is not the most up-to-date version of the deployed mobile application; and
delivering an update of the deployed mobile application.

16. The method of claim 9, wherein the request includes a device identifier, and the instructions are further configured to:
compare the device identifier with identifiers within the application table to determine whether to assign the platform server to the deployed mobile application.

17. A non-transitory computer-readable medium comprising instructions for dynamically assigning a platform server to support an application deployed on a mobile device by:
receiving a request for support from a deployed mobile application;
determining a platform server to support the deployed mobile application based on capacity data associated with a set of platform servers in an application table associated with the deployed mobile application, wherein the deployed mobile application is configured to connect to the platform server to obtain data for operation of the deployed application on the mobile device; and
delivering an identification of the platform server to the deployed mobile application, wherein identification of the platform server comprises network connectivity information configured to allow the deployed mobile application to directly connect to the platform server; and
independently of receiving requests for support, determining the platform server and delivering the identification of the platform server to the deployed mobile application: accessing the application table and determining if a new platform server should be created or an existing platform server should be deprecated based on the deployed mobile application, create a new platform server if it is determined that a new platform server should be created, and deprecate the existing platform server of the set of platform servers if it is determined that the existing platform server should be deprecated.

18. The computer readable medium of claim 17, wherein the request for support is received after a time period has elapsed or connectivity between the deployed mobile application and the platform server cannot be established.

19. The computer readable medium of claim 18, wherein if connectivity between the deployed mobile application and the platform server cannot be established, determining a new platform server to support the deployed mobile application.

20. The computer readable medium of claim 17, wherein the capacity data is associated with a total number of users each platform server within the set can support and a number of users assigned to each platform server within the set.

* * * * *